United States Patent [19]

Pelletier

[11] Patent Number: 4,730,855
[45] Date of Patent: Mar. 15, 1988

[54] ELBOW PIPE FOR ELECTRIC CONDUIT

[75] Inventor: Gilles J. Pelletier, Boynton Beach, Fla.

[73] Assignee: B.P. Technologies, Beaumont, Tex.

[21] Appl. No.: 352,051

[22] Filed: Feb. 24, 1982

Related U.S. Application Data

[63] Continuation-in-part of Ser. No. 246,627, Apr. 15, 1981, abandoned.

[51] Int. Cl.⁴ ............................................. F16L 43/00
[52] U.S. Cl. .................................. 285/179; 285/286; 174/71 R
[58] Field of Search ................... 285/15, 16, 179, 119, 285/24, 27, 127, 286; 174/68 L, 71 R, 72 R; 138/108; 403/41

[56] References Cited

U.S. PATENT DOCUMENTS

| | | | |
|---|---|---|---|
| 534,021 | 2/1895 | Swan | 285/179 |
| 1,617,277 | 2/1927 | Schmidt | 285/179 X |

FOREIGN PATENT DOCUMENTS

| | | | |
|---|---|---|---|
| 149427 | 6/1951 | Australia | 285/127 |
| 14289 | of 1906 | United Kingdom | 285/24 |
| 104248 | 3/1917 | United Kingdom | 285/179 |
| 124082 | 3/1919 | United Kingdom | 285/179 |

Primary Examiner—Dave W. Arola
Attorney, Agent, or Firm—Malin, Haley & McHale

[57] ABSTRACT

A elbow joint for a permanently mounted explosion-proof pipe which is useful for housing and commercial plant sealed electrical wiring systems that includes a plurality of movable rollers mounted within the inside gradually curved wall portions of the elbow pipe which allows an electrical conductor to be inserted or withdrawn around corners in the piping system quickly and easily. The elbow may be molded or fabricated to include one or more undulations disposed on the inside curved surfaces (along the inside radius of the elbow) to house the rollers and axles therein. Because all interior surfaces and members are permanently sealed from possible explosively hazardous atmosphere, no explosive gases may enter the sealed electrical wiring system through this elbow joint, nor may possible internal electrical arcing escape from the elbow joint into a possibly explosive atmosphere.

4 Claims, 6 Drawing Figures

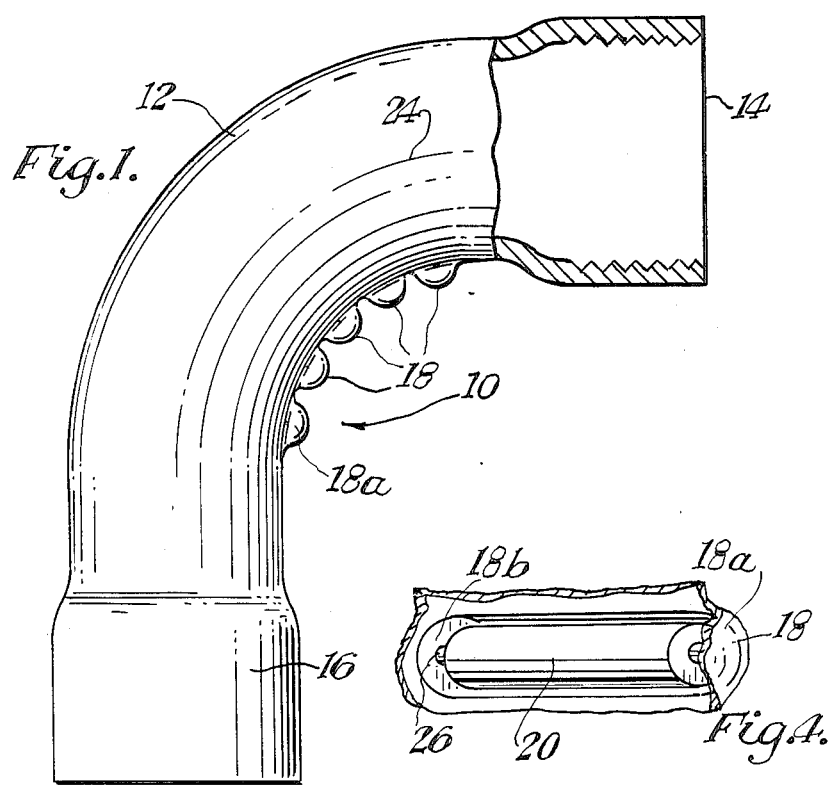
Fig.1.
Fig.4.
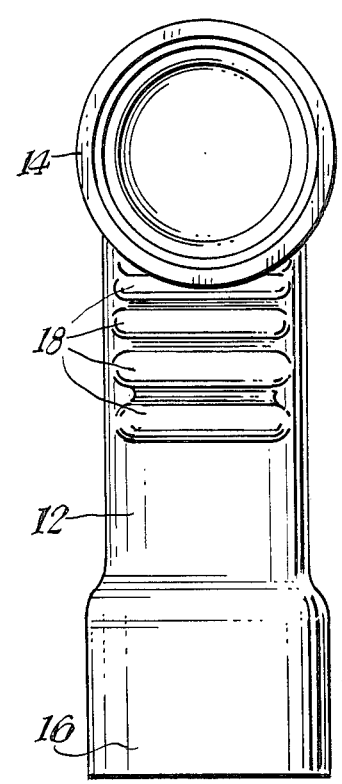
Fig.2.
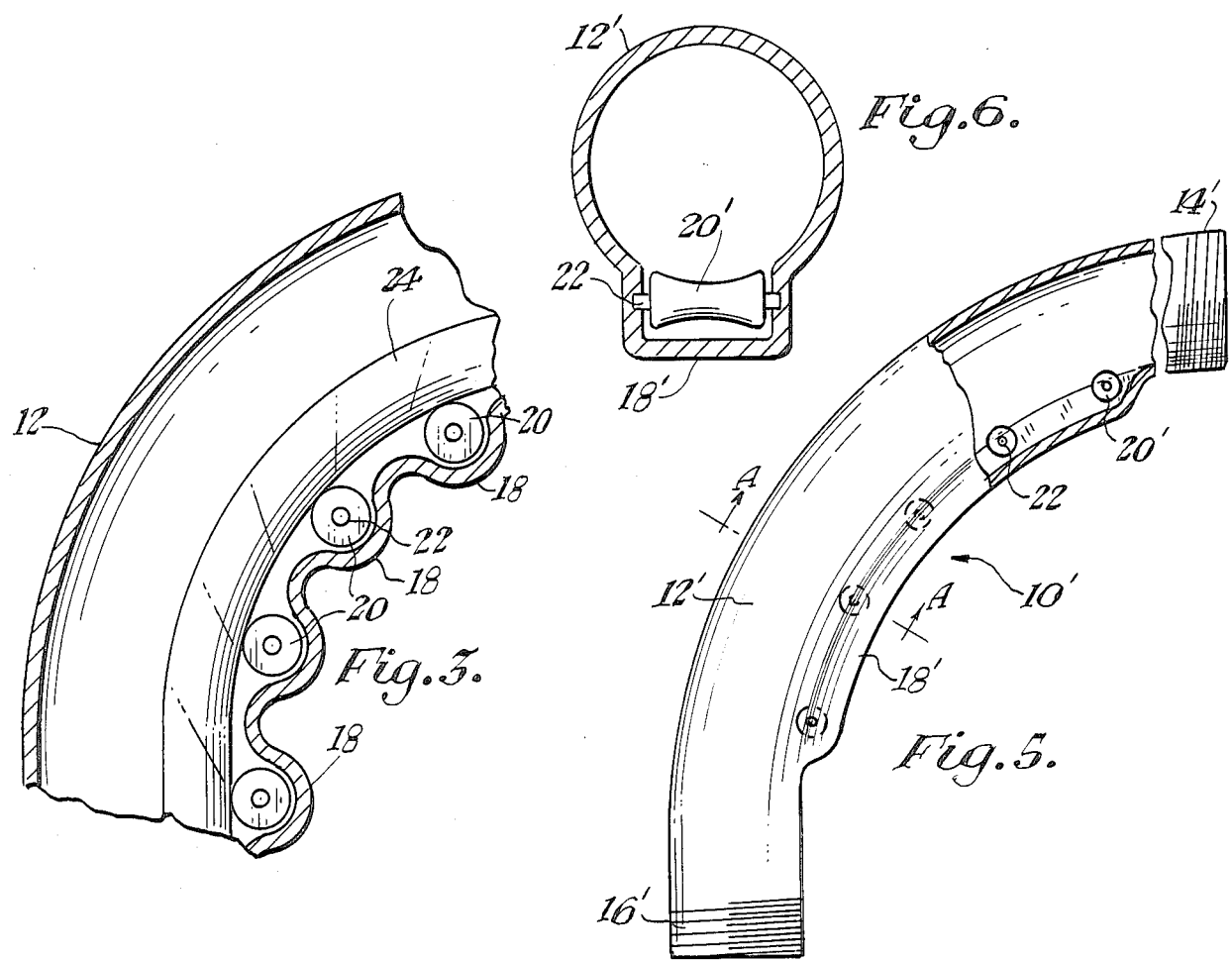
Fig.6.
Fig.3.
Fig.5.

ELBOW PIPE FOR ELECTRIC CONDUIT

This is a continuation-in-part of application Ser. No. 246,627 filed Apr. 15, 1981, now abandoned.

BACKGROUND OF THE INVENTION

This invention relates generally to non-linear conduit or piping systems which house, protect and seal from the environment electrical wiring systems and, particularly to curved joints used to join pipe segments together to allow the pipe to be disposed at some angle, usually 90 degrees, and more specifically to a pipe elbow which includes a plurality of rollers disposed along the inside curvature portion of the elbow so that an electrical wiring conductor, it is needs to be changed or removed, can be easily and quickly disposed around the corners in the piping system.

In many permanently mounted piping systems such as galvanized metal or aluminum pipes, it is impossible to remove the pipe in sections once installed. Such pipes have been traditionally used to house and protect cables, electrical wire, or other types of conductors within the pipe in a sealed environment such as chemical and petrochemical plants which frequently experience an explosively hazardous atmosphere. Oftentimes, however, it also becomes necessary to remove the electrical conductors or install new ones within the piping system. Great difficulties have been experienced in the installation and removal of electrical conductors from permanently mounted piping systems that include one or more elbow joints which may be of 90 degrees (or other angles) because of the frictional force on the electrical conductors relative to the interior surface when trying to negotiate the angle or corner joint in the piping system. Although there are other roller-type elbows available, none will safely function in an explosive atmosphere, to prevent strong internal electrical arcing from escaping from the elbow into that atmosphere or to prevent explosive gases from entering the piping system through the roller elbow.

The present invention greatly eliminates the problem of installation or removal of electrical conductors from a permanently mounted piping system around elbow joints (including 90 degree pipe joints) by providing a plurality of permanently mounted rollers which may be formed and mounted within an integrally formed elbow joint while maintaining the explosion-proof integrity of the piping system, thus meeting the most stringent Article 501, Class 1, Div. 1 and definition Article 100 requirements of the national electrical code.

BRIEF DESCRIPTION OF THE INVENTION

A pipe elbow joint comprising a rigid tubular housing, said longitudinal axis of said tubular housing forming an angle less than 180 degrees, said tubular housing including one or more raised surface portions forming one or more interior pockets disposed along the inside gradually curved portions of the housing, and a plurality of rollers, each being mounted within a pocket within the housing. In one embodiment each roller has an interiorally exposed surface portion extending into and above the interior contour surface of the tubular device. In another embodiment the housing may be unitarily formed including one or more raised surface portions along the inside axial curvature or may be fabricated from more than one precast or fabricated component. In the preferred embodiment each roller and roller axle is mounted such that the axle is connected to the generally parallel inside walls of a single formed inside pocket, allowing the roller, which may be a rigid circular-sectioned cylindrical surface, to freely move relative to the tubular housing. Each cylindrical roller is of sufficient radial size that a portion of the roller surface projects interiorly beyond the inner surface of the conduit.

In operation, this invention is mounted within the piping system and may be in an inaccessible place or in a regularly hazardous atmosphere. The rollers are positioned such that electrical wires, cables or other elongated flexible conductors, which are received into the piping system or a part thereof, are allowed to engage the rollers whenever the electrical cables or wires are being pulled through the elbow portions of the system.

To accomplish total sealing of the elbow, including rollers and axles, and thus to meet the requirements of the National Electrical code, a number of manufacturing options are available. Of primary importance is the strength of the tubular walls. Therefore, the curved tubular structure should be cast, fabricated, or extruded having sufficient wall thickness and of sufficiently strong material to meet the requirements of the National Electrical Code for explosion-proof members. If this device is made by welding (or by other like process) two mating halves together, axle pockets may be cast into the mating halves and rollers, with axles therein, may be simultaneously assembled into the mating halves as they are unitized. Alternately, a sub housing carrying the axles and rollers therein may be welded onto a suitably prepared hole through the inside radius wall of the main elbow housing. If rollers and axles are to be installed subsequent to final preparation of the entire elbow housing, the axles may be spring-loaded of telescoping length, after which each roller with a telescoping axle therein is fitted into position within the housing. Alternately, the axle pockets in the housing may be through-holes, in which case, after axles and rollers are assembled into the housing, each hole is welded entirely shut.

It is an object of this invention to provide an improved pipe elbow for making it easier to insert or remove electrical cables in a permanently mounted piping system having bends or angled portions.

It is another object of this invention to provide an improved pipe elbow which allows the piping system to remain in a sealed condition in areas such as plants having hazardous explosive gases therein and which includes friction reducing means disposed along curved areas of the pipe for allowing the installation or removal of electrical conductors or the like within the elbow.

And yet still another object of this invention is to provide a pipe elbow which greatly reduces the time for installing or removing electrical conductors in a piping system having axially curved portions therein.

In accordance with these and other objects which will be apparent hereinafter, the instant invention will now be described with particular reference to the accompanying drawings.

BRIEF DESCRIPTION OF THE DRAWINGS

FIG. 1 shows a side elevational view of the instant invention.

FIG. 2 shows a front elevational view of the instant invention.

FIG. 3 shows a side cross-sectional view, fragmentary and partially cut away showing a portion of the instant invention with a fragmentary portion of an electrical conduit disposed therein.

FIG. 4 shows a perspective view of the inside chamber wall and roller as utilized in the instant invention.

FIG. 5 shows a side fragmented sectional view of an alternate embodiment of the invention with a fragmentary portion of an electrical conduit disposed therein.

FIG. 6 is a sectional view through A—A of FIG. 5.

PREFERRED EMBODIMENT OF THE INVENTION

Referring now to the drawings and specifically FIG. 1, the instant invention is shown generally at 10 as an elbow comprised of a rigid, tubular intermediate housing 12 which, as shown, forms a curved pipe elbow having inner and outer concentric radii of curvature for a 90 degree elbow joint in a pipe system, although the elbow may be formed in any desired acute or obtuse angle. Each end of the intermediate housing 12 is shown in conjunction with the sections 14 and 16 of a different radius of curvature than intermediate housing 12 and being joinable to other sections of a threaded pipe system. Typically, the elbow 10 may be made of cast, fabricated, or extruded steel, iron or aluminum. The elbow pipe shown is useful for permanent mounting such as being in poured concrete or the like or may be utilized to house electrical conductors or other types of cable or wire in plants which create explosive gases as by products. The tubular intermediate housing 12 includes one or more raised surface portions 18 which in the embodiment shown are formed along the surface forming the interior angle of the elbow housing. The raised portion of the housing 18 may be integrally formed in the construction of the housing 12 and in effect, if a plurality of same are used, form an undulating hill and valley surface portion along the elbow housing surface.

Referring now to FIG. 2, the raised portions 18 are shown from a front view.

FIG. 3 shows a plurality of rollers 20 which are rigid, cylindrically shaped and circularly sectioned rollers having axles 22 disposed through the central axes of the cylinders 20, the roller radius in each case being sized to fit receive within the spaced recessed portions 18 of the tubular intermediate housing 12. A representative electrical cable 24 is shown as it would engage the rollers if the cable were under tension and being pulled through the elbow section. The cable 24 engages the rollers which freely move and rotate such that the cable may be easily and quickly pulled through the elbow section.

FIG. 4 shows a raised portion of the tubular housing 18 which has side walls 18a and 18b that engage axle 22 disposed through roller 20 such that the roller 20 moves and rotates freely. The roller radius 20 is such that a portion of the roller exterior surface protrudes into the interior of the tubular housing without greatly reducing the cross-sectional area of the housing to permit a maximum size electrical conductor to be disposed within the housing. Housing receptacles for the axles are in the form of through holes 26 which have been welded closed after assembly of the rollers and axles into the housing to insure the sealed explosion-proof integrity of the entire elbow assembly.

An alternate form of this invention 10' is shown in FIG. 5. In ends 14' and 16' of the housing 12' have male threads thereon. A sub-housing 18' is fabricated or cast separately from the manufacture of the elbow housing. Rollers 20' and axles 22 are then sub-assembled into this sub housing, again, insuring the sealed explosion-proof integrity of the entire assembly by one of the means previously discussed. Rollers 22' are non-cylindrical, having a generally concave contour which more effectively mates with the typical circular section found in electrical conductors, etc. This sub housing is then welded onto the main housing over a suitably prepared hole through the inner radius surface of the main housing.

A cross-section through A—A of FIG. 5 is shown in FIG. 6. The concave profile of the roller 20' has a shape adapted such that none of the cross sectional area of the housing 12' is lost to the roller 20'.

The instant invention has been shown and described herein in what is considered to be the most practical and preferred embodiment. It is recognized, however, that departures may be made therefrom within the scope of the invention and that obvious modifications will occur to a person skilled in the art.

What I claim is:

1. A unitary functionally integral elbow pipe joint for use in a pipe system for housing electrical wiring, cable or conductors comprising:
   (a) a gradually curved impervious pipe section extending initially from the inlet of said section at an angle of 0° to the outlet thereof at 90°;
   (b) a plurality of identically shaped cylindrical rollers rotatably mounted along the inner surface of the inner curvature of said intermediate section;
   (c) said rollers being so arranged and mounted that a portion of the cylindrical surface of each of said rollers protrudes slightly into the interior of said curved pipe section without significantly reducing the effective interior cross-sectional area of said curved pipe section;
   (d) one of said rollers being mounted contiguous to said inlet and another of said rollers being mounted contiguous to said outlet;
   (e) at least one additional roller mounted along the inner curvature of said curved section of said pipe section and disposed between said rollers mounted at the said outlet and inlet and being spaced therefrom at least a distance equal to the diameter of said rollers;
   (f) the number of said rollers being so selected to allow improved conveyance of an electrical conductor through said section with minimal force; and
   (g) the inner surface of said pipe section being so shaped to accomodate said remaining portions of the cylindrical surfaces of each of said plurality of rollers.

2. An elbow pipe joint as recited in claim 1 wherein the shape of said inner surface is of undulating curvature thereby forming a plurality of spaced pockets, each being so shaped to receive a single roller for rotation therein.

3. An elbow pipe as recited in claim 1 wherein the pipe is of one piece construction and having the surface thereof impervious to the passage of a gaseous medium thereby preventing possible explosive gases from penetrating the surface thereof.

4. An elbow joint as recited in claim 1 wherein each of said rollers having a generally concave contour of a radius of curvature substantially identical to the radius of curvature of said pipe.

* * * * *